April 16, 1968    F. J. BAMBACH    3,378,210
MACHINE FOR CUTTING PLASTIC CHUNKS INTO GRANULATE
Filed Oct. 27, 1965    2 Sheets-Sheet 1
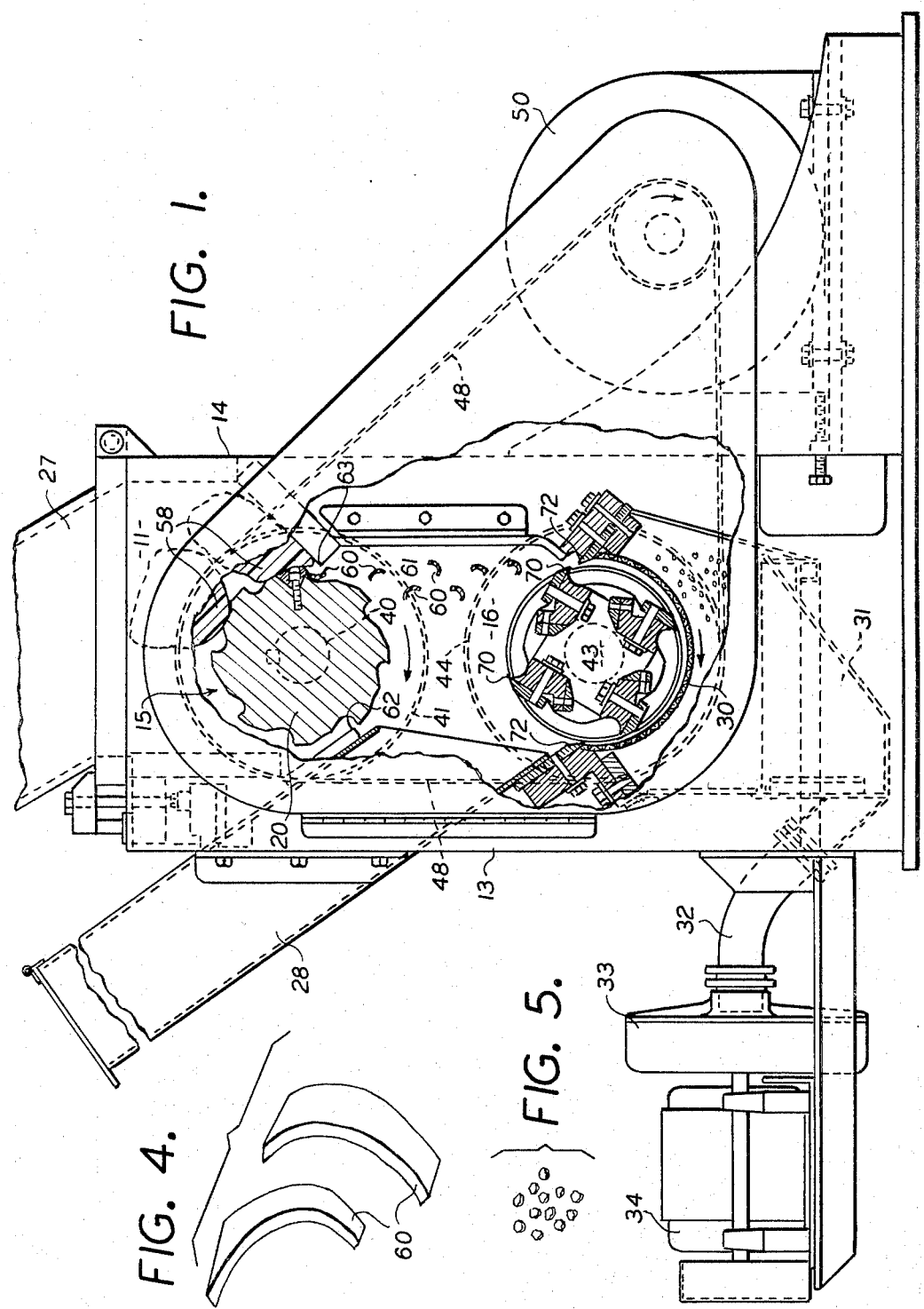
INVENTOR
FRITZ J. BAMBACH
BY Byerly, Townsend, Watson
& Churchill ATTORNEYS.

April 16, 1968   F. J. BAMBACH   3,378,210
MACHINE FOR CUTTING PLASTIC CHUNKS INTO GRANULATE
Filed Oct. 27, 1965   2 Sheets-Sheet 2
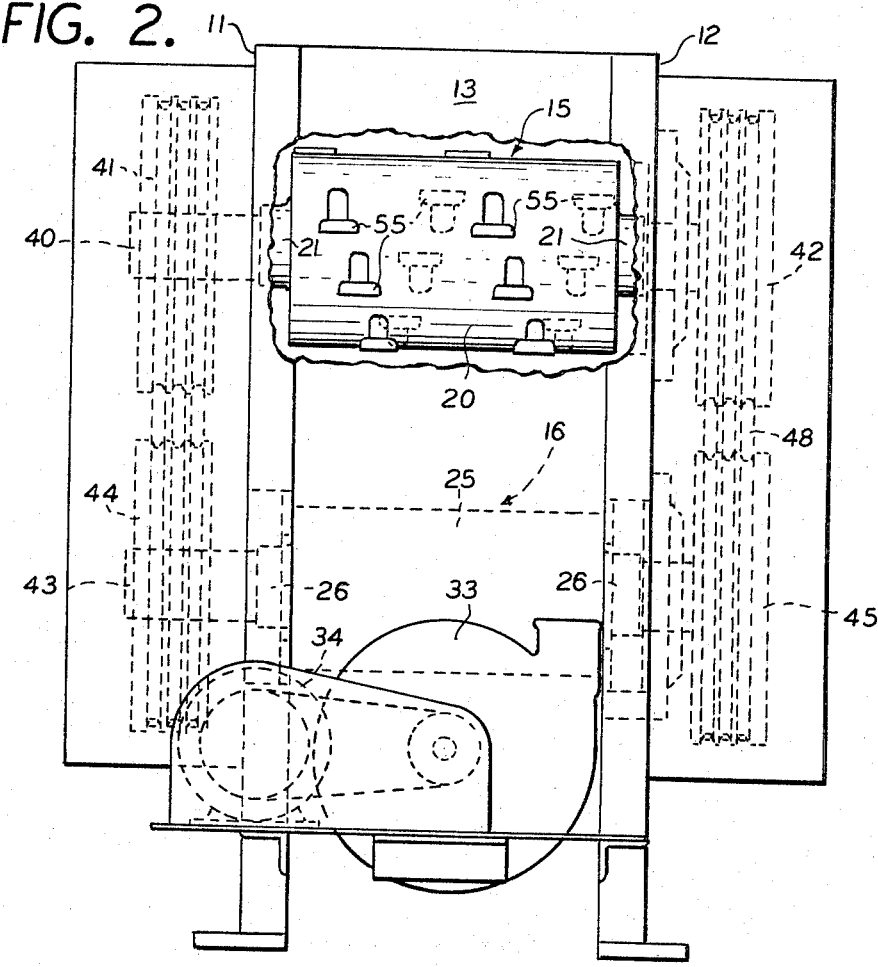
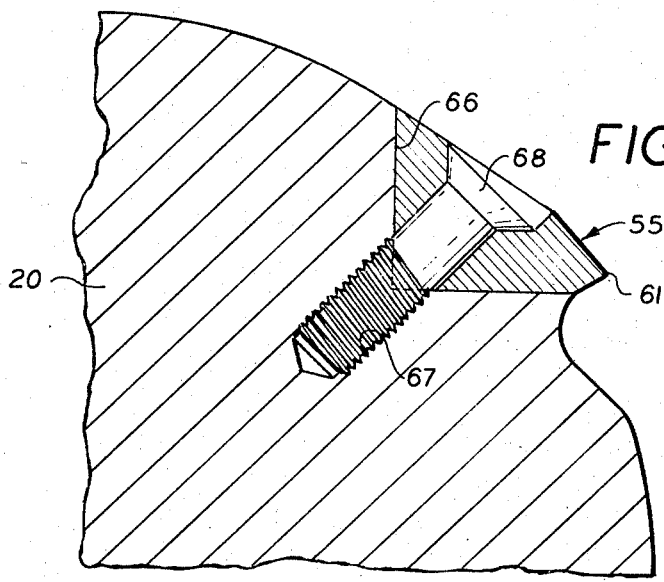
INVENTOR
FRITZ J. BAMBACH
BY
ATTORNEYS.

United States Patent Office 3,378,210
Patented Apr. 16, 1968

3,378,210
MACHINE FOR CUTTING PLASTIC CHUNKS INTO GRANULATE
Fritz J. Bambach, Livingston, N.J., assignor to Lee Heydenreich, Essex Fells, N.J.
Filed Oct. 27, 1965, Ser. No. 505,352
3 Claims. (Cl. 241—160)

ABSTRACT OF THE DISCLOSURE

A two-stage grinding machine for reducing plastic and like chunks into granulate is provided with an upper chamber for receiving plastic chunks, a rotatable roller in the upper chamber having knives spaced axially and circumferentially along its surface and a concave recess in front of each knife, the knives cooperating with a shearing plate to cut curlings from said chunks, the curlings being accommodated in such recesses and then delivered to the second stage. In the second stage there is a second chamber having at least two rotating cutting blades, a pair of cooperating shearing plates, and a perforated screen at the base, the curlings being reduced to pellet or granular size so as to pass through the screen into a collecting trough from which they are removed by suction or fan means. An auxiliary hopper for feeding smaller chunks or segments directly to the second chamber is also provided.

---

The present invention relates to a machine for cutting plastic chunks into granulate. More particularly, the invention provides a two-stage grinding machine for reducing plastic or like chunks into granulate. In the first stage the large chunks are reduced to chips or curlings, and in the second stage the chips or curlings are reduced to granulate of a predetermined size.

Heretofore, in the plastic art, waste plastic material in the form of what is sometimes called "purgings" has been collected in the form of chunks and sold as scrap at a substantial reduction in price; or reduced to granular form for reuse provided the difference in price would justify the high cost of machinery and equipment for granulating the same.

In the plastic coated wire industry the wire is drawn and the plastic coating then applied thereto. The extruding of the plastic coating is a continuous operation, whereas the wire drawing is interrupted from time to time. It has been found to be uneconomical to stop the plastic extrusion between successive wire drawing operations. Hence, the plastic continues to extrude and is collected as a purging capable of reuse when reduced to proper pellet size.

One of the principal plastics used in the coated wire industry is high density polyethylene. The purgings of this material have a rubbery consistency which makes it difficult to granulate. It has heretofore been proposed to cut such purgings successively into sections by means of a guillotine knife which is forced through the masses or chunks of such purgings. Such machines had to be extremely rugged, very large, were necessarily quite expensive, and required about 150 H.P. to operate. Nevertheless, they would jam quite frequently.

By virtue of the present invention is has been found possible to reduce the size, the ruggedness, and cost of machines for grinding plastic chunks into granulate, and to operate the same with approximately 25 H.P. motors.

In the accompanying drawings:

FIGURE 1 is a side elevational view, partly in section, of the machine of the present invention.

FIG. 2 is a front elevational view of the machine of FIG. 1, with parts broken away to show underlying structure.

FIG. 3 is an enlarged fragmentary cross-sectional view of one of the curling knives mounted in the upper roller.

FIG. 4 is a perspective view of two "curls" in approximately full size as produced by the upper roll of the present invention.

FIG. 5 is a perspective view in approximately full size of the granulate produced by the present invention.

Referring now more particularly to the drawings, it will be noted that the machine has two side wall members 11, 12 and front and rear walls 13, 14 which enclose an upper grinding chamber 15 and a lower grinding chamber 16. In the upper grinding chamber there is a cutting roller 20 having suitable bearings 21 in the side wall members 11, 12. In the lower grinding chamber 16 there is a second cutting roller 25 also having suitable bearings 26 in the side wall members 11, 12.

At the top of the machine and above grinding chamber 15 is a hopper 27 into which chunks of plastic or like material to be granulated may be fed. In the rear wall 14 of the machine there is an auxiliary hopper or chute 28 for feeding material to be granulated directly to the cutting roller 25 in the lower grinding chamber 16 and thereby bypassing the upper cutting roller 20.

In the lower grinding chamber 16, below the lower cutting roller 25, there is a semi-cylindrical screen 30 having a plurality of perforations of a predetermined particle size which permit granulate of that size to fall through the screen into a trough 31. Such granular particles are continuously removed from the trough by a suction tube 32 and a suction fan 33 which is driven by a suitable motor 34. The granular particles thus removed may be collected in a suitable container.

It will be noted from FIG. 2 that the shaft 40 for the upper cutting roller 20 protrudes through and extends beyond the side wall members 11, 12 and has pulleys 41, 42 at each end of said shaft. The shaft 43 for the lower cutting roller 25 is similarly constructed and is provided with pulleys 44, 45. The pulleys 41, 44 on the one side of the machine and 42, 45 on the other side of the machine are respectively connected by a series of V-belts 48 which, as seen in FIG. 1, are driven by an electric motor 50.

An important feature of the present invention is the upper knife roller assembly which is so constructed and arranged that it will reduce chunks of plastic and like material to "curls" of the general size and configuration as shown in FIG. 4, and deliver them to the lower knife roller assembly where they are cut into granulate of predetermined size. As will be seen in FIG. 2 the upper roller 20 is provided on its surface with a series of relatively narrow knives 55 which are axially and circumferentially spaced on the cylindrical surface of the roller 20 so as to bring such knives successively into engagement with chunks of plastic or like material 58, as the upper roller is rotated, to form a series of "curls" 60. Preferably, only two axially-spaced knives 55 engage a shearing plate at one time. Also, the curling knives 55 are circumferentially spaced in echelon so that each successive knife cuts adjacent the cut of the preceding knife.

It will be noted from FIG. 1 that the knife edge 61 of each curling knife 55 engages shearing plates 62, 63 which extend across the machine between the side wall members 11, 12 and constitute the bottom of the upper grinding chamber 64. Thus, when the plastic chunks 58 are fed into the upper grinding chamber 15 through the hopper 27 they are retained therein by the shearing plates 62, 63 in engagement with the knife roller 20, and only the "curls" cut from such chunks are delivered to the lower grinding chamber 16.

It will be noted from FIG. 3 that the surface of the roller 20 has been provided with a V-shaped recess 66 to accommodate the complementally-shaped body portion of each curling knife, and that each such knife is held in assembled relationship with the roller 20 by means of a screw-threaded bore 67 and a flat-headed machine screw 68. It will also be noted from FIGS. 2 and 3 that the surface of the roller in front of the knife edge 61 of each curling knife 55 has a concave recess of a depth to accommodate the "curl" as it is formed and of a width approximately twice the width of the knife 55. It has also been found in practice that the angle of the cutting knife 55 with respect to the horizontal as shown in FIG. 3 preferably should be approximately 45°.

As seen in FIG. 1 the lower grinding chamber assembly comprises the roller 25 having mounted entirely across its operating surface a plurality of knives 70 which upon rotation cooperate with fixed knives 72 and cut the "curls" 60 into pellet or granular form.

As before stated a perforated semi-cylindrical screen 30 forms the bottom of the lower grinding chamber 16 and permits pellets or granular particles of the size determined by the perforations to fall through into the trough 31 while retaining the larger size particles within the lower grinding chamber for further regrinding. Also, as before stated, the pellets or particles are continuously removed from the trough by means of the suction tube 32 and the suction fan 33 and delivered to a collecting receptacle.

From the foregoing description it will be understood that by virtue of the fact that the plastic chunks are first reduced to the form of "curls" of predetermined width and thickness, and that these "curls" in turn are reduced to pellet size—the machine of the present invention does not have to be as sturdy and massive as machines of the prior art which utilize a guillotine type of knife for cutting through the plastic chunks on each stroke of the knife. Also, as before stated, it has been found that the grinding rollers of the present invention can be satisfactorily operated with a 25 H.P. motor as contrasted with a 150 H.P. motor which was usually required for the guillotine knife type of machine. A further advantage of the present invention is that the machine may be operated continuously and that a continuous supply of reground pellet or granular material will be delivered, rather than in batch form.

The chute 28 is so arranged in an end wall of the machine that smaller sized chips may be fed directly into the lower grinding chamber 16 if they are of such a size that the formation of "curls" is not required.

As will be evident to those skilled in the art, the present invention permits various modifications without departing from the spirit thereof or the scope of the appended claims.

What I claim is:

1. A machine for reducing chunks of plastic and like material to granular form comprising:
    an upper chamber for receiving chunks of said material;
    a rotatable roller within said chamber having a plurality of knives spaced axially and circumferentially along the surface of said roller each having a cuting edge for engaging said chunks, and a concave recess in front of each said cutting edge;
    a tangentially disposed shearing plate substantially in engagement with the lower portion of the surface of said roller and serving with said roller to maintain said chunks in said upper chamber;
    each said knife in cooperation with said shearing plate and recess upon rotation of said roller, adapted to cut a curling from a chunk of a size to accommodate in said recess and to deliver the same to
    a second chamber below said first chamber having at least two rotating cutting blades, a pair of stationary shearing plates cooperating therewith, and a perforated screen at the base of said chamber,
    whereby said curlings from said upper chamber are reduced to predetermined granular size in said second chamber.

2. A machine according to claim 1 having a trough beneath the screen of the lower chamber for collecting granular particles of the size passed through said screen, and having suction tube and fan means for removing said granular particles from said trough.

3. A machine according to claim 1 having a main hopper for feeding chunks to said upper chamber, and an auxiliary hopper for feeding smaller segments directly to said second chamber.

References Cited

UNITED STATES PATENTS

| | | | |
|---|---|---|---|
| 526,043 | 9/1894 | Merrill | 144—172 X |
| 3,162,222 | 12/1964 | Kirsten | 144—172 |
| 3,209,801 | 10/1965 | Little et al. | 144—172 |
| 3,301,291 | 1/1967 | Hughes | 241—186 X |

JAMES M. MEISTER, *Primary Examiner.*